(12) United States Patent
Clack et al.

(10) Patent No.: US 8,340,094 B2
(45) Date of Patent: Dec. 25, 2012

(54) METHOD, APPARATUS, SYSTEM, AND ARTICLE OF MANUFACTURE FOR RELIABLE LOW-BANDWIDTH INFORMATION DELIVERY ACROSS MIXED-MODE UNICAST AND MULTICAST NETWORKS

(75) Inventors: Derick J. Clack, Seattle, WA (US);
Bryan D. Vergato, Seattle, WA (US);
Mark D. Bertoglio, Seattle, WA (US);
Shaun Botha, Seattle, WA (US);
Edward E. Buchwalter, Bellevue, WA (US); Guillaume F. Rava, Seattle, WA (US); Yuri Kiryanov, Kirkland, WA (US); Thomas Richard Bogart, Seattle, WA (US); Michael A. Passinsky, Seattle, WA (US)

(73) Assignee: Twisted Pair Solutions, Inc., Seattle, WA (US)

( * ) Notice: Subject to any disclaimer, the term of this patent is extended or adjusted under 35 U.S.C. 154(b) by 231 days.

(21) Appl. No.: 12/494,728

(22) Filed: Jun. 30, 2009

(65) Prior Publication Data
US 2010/0002698 A1    Jan. 7, 2010

Related U.S. Application Data

(60) Provisional application No. 61/077,413, filed on Jul. 1, 2008, provisional application No. 61/101,466, filed on Sep. 30, 2008.

(51) Int. Cl.
*H04L 12/28* (2006.01)

(52) U.S. Cl. ........ 370/390; 370/254; 370/328; 370/338; 370/401

(58) Field of Classification Search .................. 370/254, 370/256, 328, 338, 400, 401
See application file for complete search history.

(56) References Cited

U.S. PATENT DOCUMENTS

| | | | | |
|---|---|---|---|---|
| 5,412,654 A * | 5/1995 | Perkins | ......................... | 370/312 |
| 5,717,689 A * | 2/1998 | Ayanoglu | ....................... | 370/349 |
| 5,987,011 A * | 11/1999 | Toh | ................. | 370/331 |
| 6,751,200 B1 * | 6/2004 | Larsson et al. | ................ | 370/255 |
| 6,775,258 B1 * | 8/2004 | van Valkenburg et al. | .... | 370/338 |
| 6,795,688 B1 * | 9/2004 | Plasson et al. | ................ | 455/41.2 |
| 7,483,397 B2 * | 1/2009 | Meier et al. | .................... | 370/256 |
| 7,512,124 B2 * | 3/2009 | Sangroniz et al. | ............ | 370/390 |
| 7,522,537 B2 * | 4/2009 | Joshi | ............................. | 370/254 |
| 7,522,731 B2 * | 4/2009 | Klemba et al. | ................ | 380/285 |
| 7,698,463 B2 * | 4/2010 | Ogier et al. | .................... | 709/242 |
| 7,734,293 B2 * | 6/2010 | Zilliacus et al. | .............. | 455/445 |
| 7,876,756 B2 * | 1/2011 | Muramoto et al. | ........... | 370/390 |
| 7,899,951 B2 * | 3/2011 | Mahany et al. | ................. | 710/18 |

(Continued)

OTHER PUBLICATIONS

L. Girod et al., A Reliable Multicast Mechanism for Sensor Network Applications, Center for Embedded Networked Sensing, 12 pages.

(Continued)

*Primary Examiner* — Ayaz Sheikh
*Assistant Examiner* — Andrew C Lee
(74) *Attorney, Agent, or Firm* — Seed IP Law Group PLLC

(57) ABSTRACT

A system and method are provided wherein information is disseminated using a reliable IP multicast network implementation coupled with dynamically assigned proxy nodes serving as zonal aggregation points. These nodes share information with each other over the reliable IP multicast network, augmenting this function with a reliable point-to-point communication infrastructure between proxy nodes in those instances where IP multicast is not available or prone to error.

26 Claims, 15 Drawing Sheets

U.S. PATENT DOCUMENTS

| | | | |
|---|---|---|---|
| 7,961,646 B2 * | 6/2011 | Liu et al. | 370/254 |
| 7,961,694 B1 * | 6/2011 | Chan et al. | 370/341 |
| 8,005,952 B2 * | 8/2011 | Kammer et al. | 709/225 |
| 2001/0005368 A1 * | 6/2001 | Rune | 370/390 |
| 2002/0044549 A1 * | 4/2002 | Johansson et al. | 370/386 |
| 2004/0141511 A1 * | 7/2004 | Rune et al. | 370/401 |
| 2004/0233855 A1 * | 11/2004 | Gutierrez et al. | 370/252 |
| 2004/0233881 A1 * | 11/2004 | Kang et al. | 370/338 |
| 2004/0260814 A1 | 12/2004 | Budge et al. | |
| 2004/0264466 A1 * | 12/2004 | Huang | 370/392 |
| 2005/0135286 A1 * | 6/2005 | Nurminen et al. | 370/310 |
| 2005/0152305 A1 * | 7/2005 | Ji et al. | 370/328 |
| 2006/0126587 A1 * | 6/2006 | Tsubota | 370/338 |
| 2006/0212582 A1 | 9/2006 | Gupta et al. | |
| 2006/0218301 A1 | 9/2006 | O'Toole et al. | |
| 2006/0268749 A1 * | 11/2006 | Rahman et al. | 370/256 |
| 2006/0285529 A1 * | 12/2006 | Hares et al. | 370/338 |
| 2008/0056257 A1 | 3/2008 | Furukawa et al. | |
| 2008/0062941 A1 * | 3/2008 | Rhee et al. | 370/338 |
| 2008/0069105 A1 * | 3/2008 | Costa et al. | 370/392 |
| 2008/0117823 A1 * | 5/2008 | Krishnakumar et al. | 370/236 |
| 2008/0181161 A1 * | 7/2008 | Gi Kim et al. | 370/312 |
| 2008/0219237 A1 * | 9/2008 | Thubert et al. | 370/349 |
| 2008/0240096 A1 | 10/2008 | Botha et al. | |
| 2009/0023324 A1 * | 1/2009 | Koike et al. | 439/345 |
| 2009/0116393 A1 * | 5/2009 | Hughes et al. | 370/238 |
| 2009/0231189 A1 * | 9/2009 | Reddy et al. | 342/357.07 |
| 2009/0257432 A1 * | 10/2009 | Yamaguchi et al. | 370/390 |
| 2010/0142446 A1 * | 6/2010 | Schlicht et al. | 370/328 |

OTHER PUBLICATIONS

S. Botha et al., Wide Area Voice Environment Multi-Channel Conferencing System, U.S. Appl. No. 60/516,233, filed Oct. 31, 2003.

S. Botha et al., Method, Apparatus, System, and Article of Manufacture for Providing Supernodes in a Communication Network Environment, U.S. Appl. No. 60/908,878, filed Mar. 29, 2007, 30 pages.

D. Clack et al., Method, Apparatus, System, and Article of Manufacture for Reliable Low-Bandwidth Information Delivery Across Mixed-Mode Unicast and Multicast Networks, U.S. Appl. No. 61/077,413, filed Jul. 1, 2008, 20 pages.

S. Botha et al., Wide Area Voice Environment Multi-Channel Communications System and Method, U.S. Appl. No. 10/977,115, filed Oct. 29, 2004.

* cited by examiner

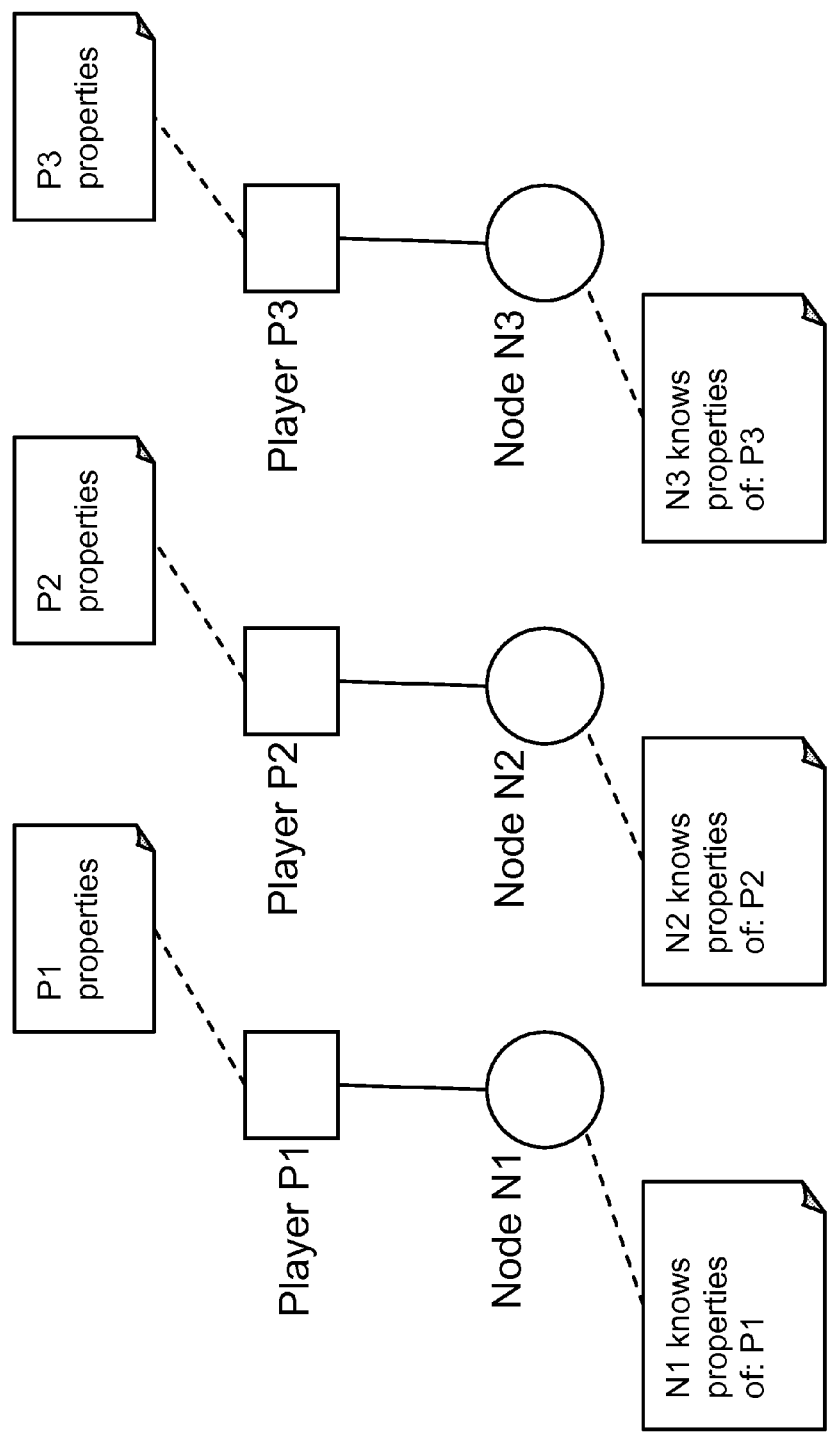
Figure 1 - nodes with associated players

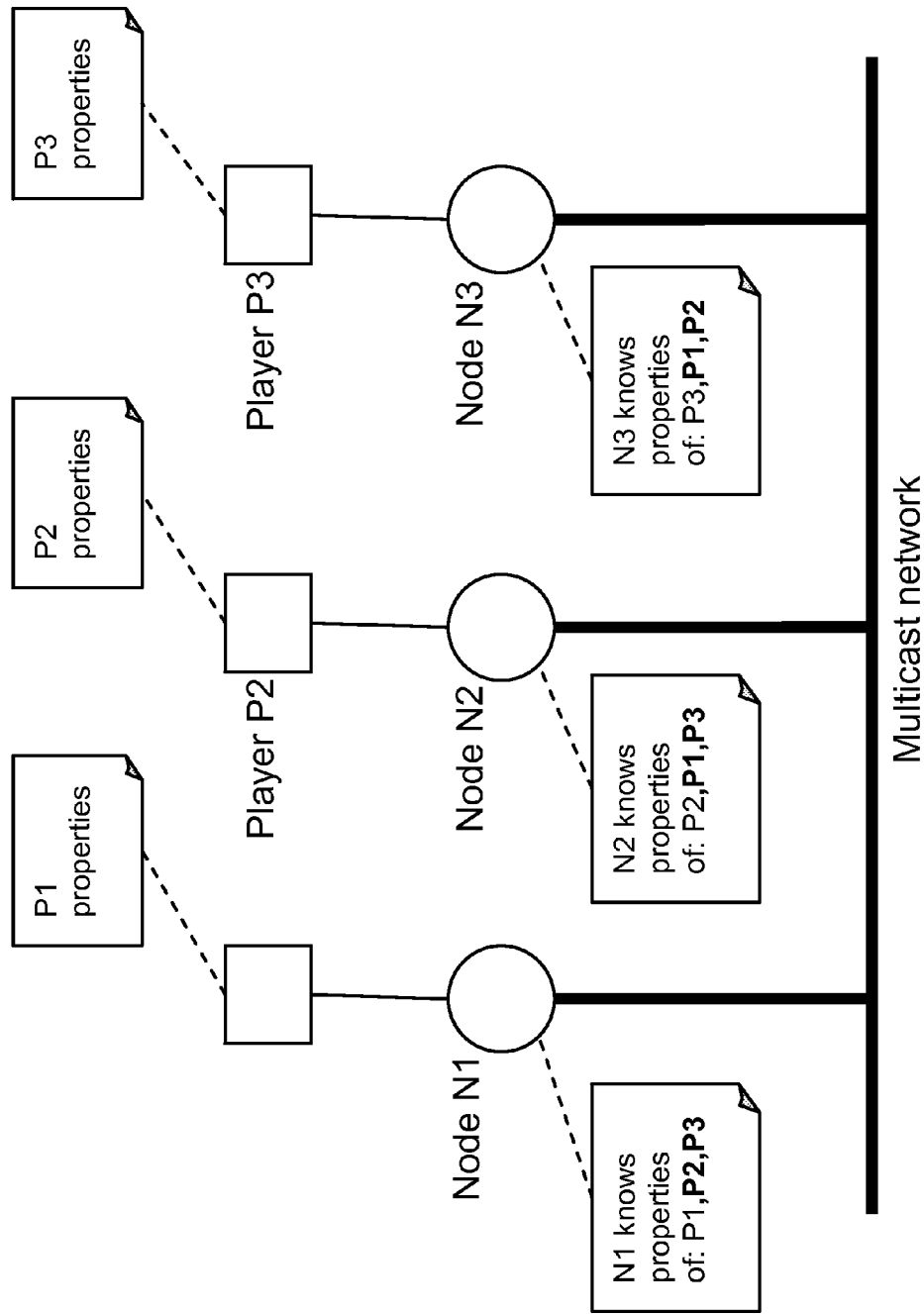
Figure 2 - nodes exchange player information

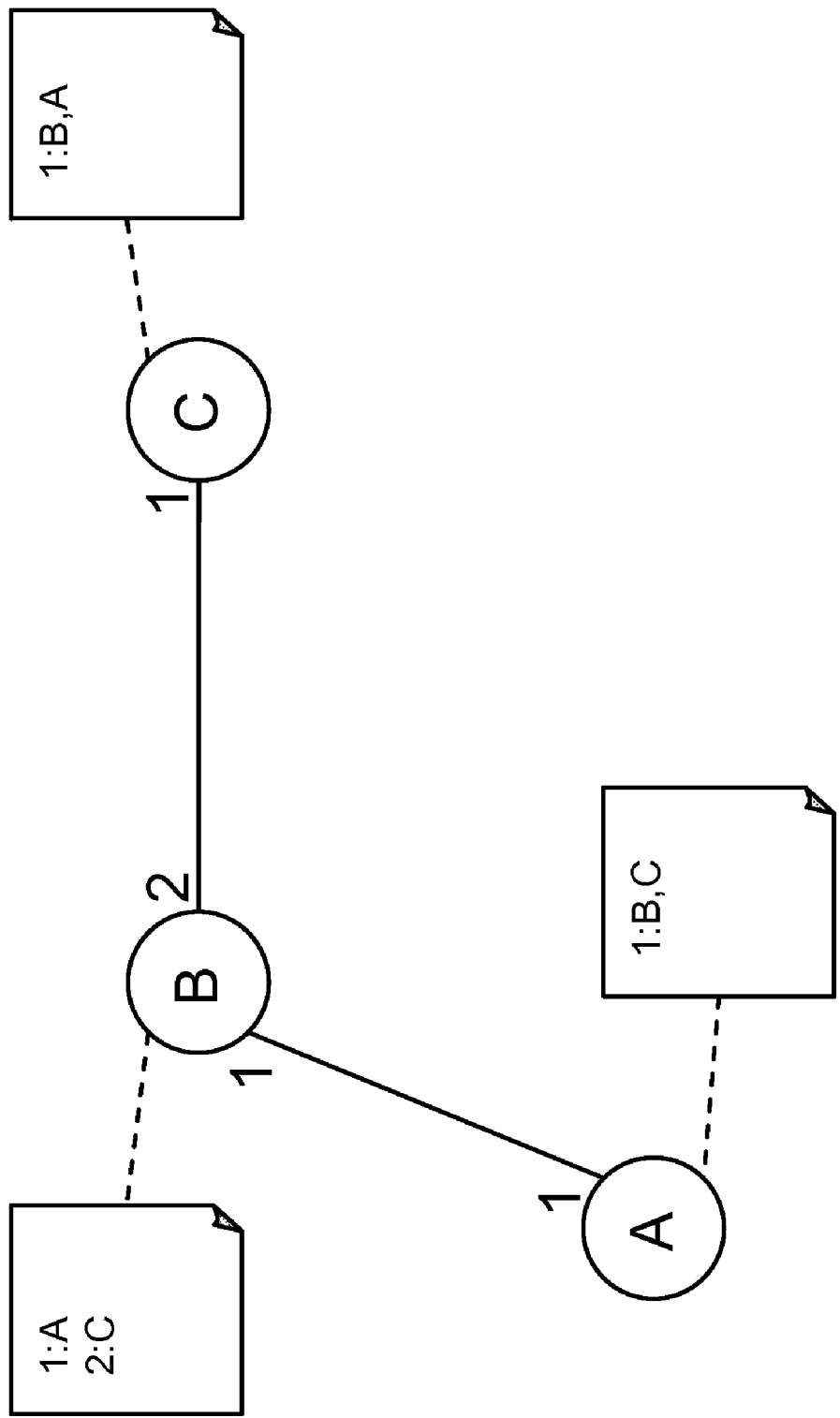
Figure 3 – Nodes and routing tables

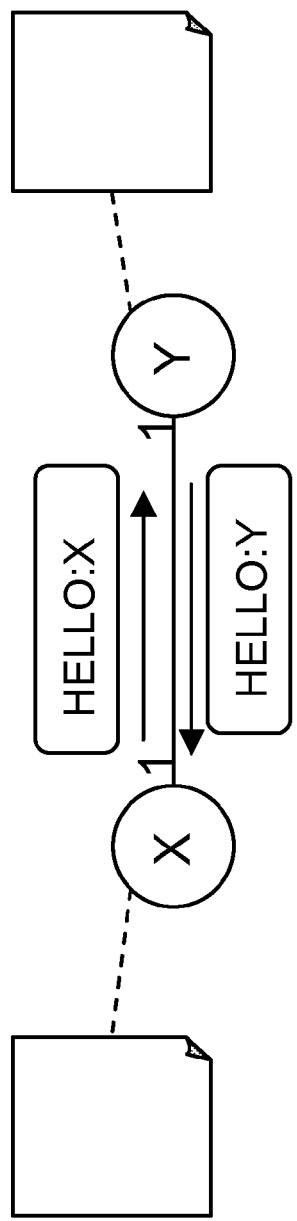
Figure 4 - Nodes X and Y are establishing a new link and exchanging HELLO messages.

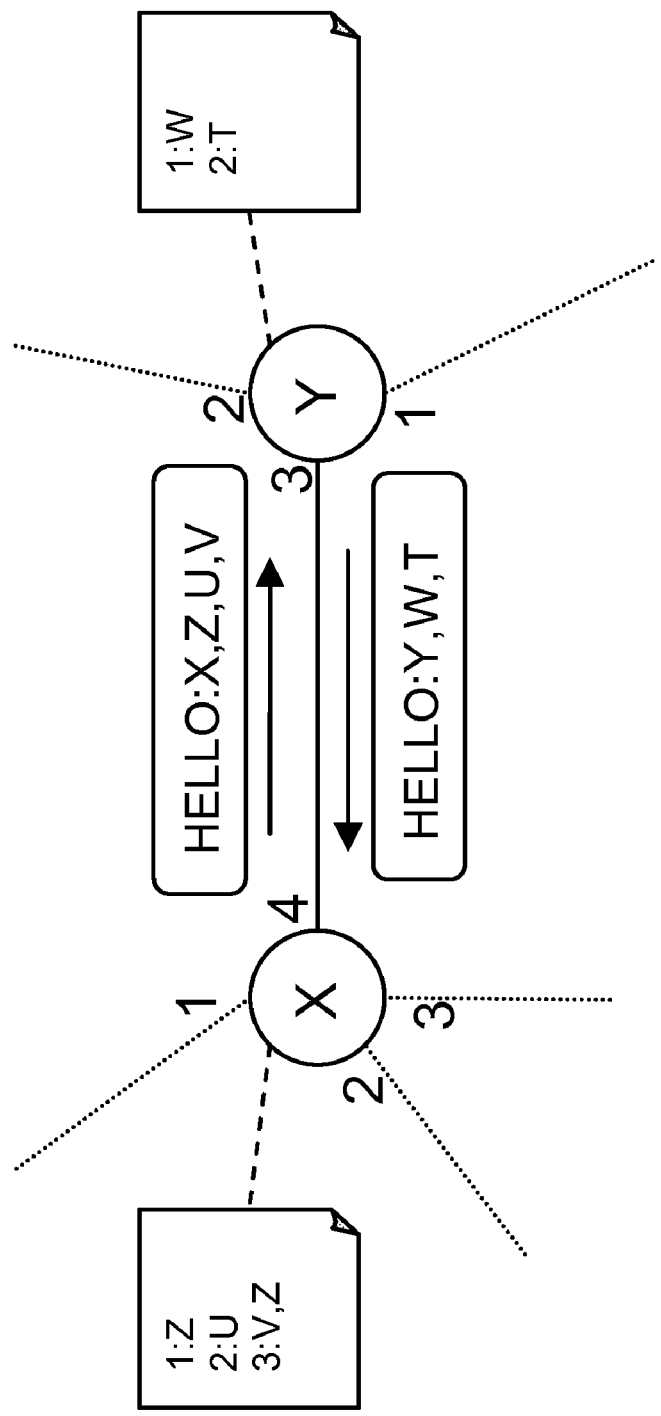
Figure 5 - Nodes X and Y are establishing a new link and exchanging composite HELLO messages.

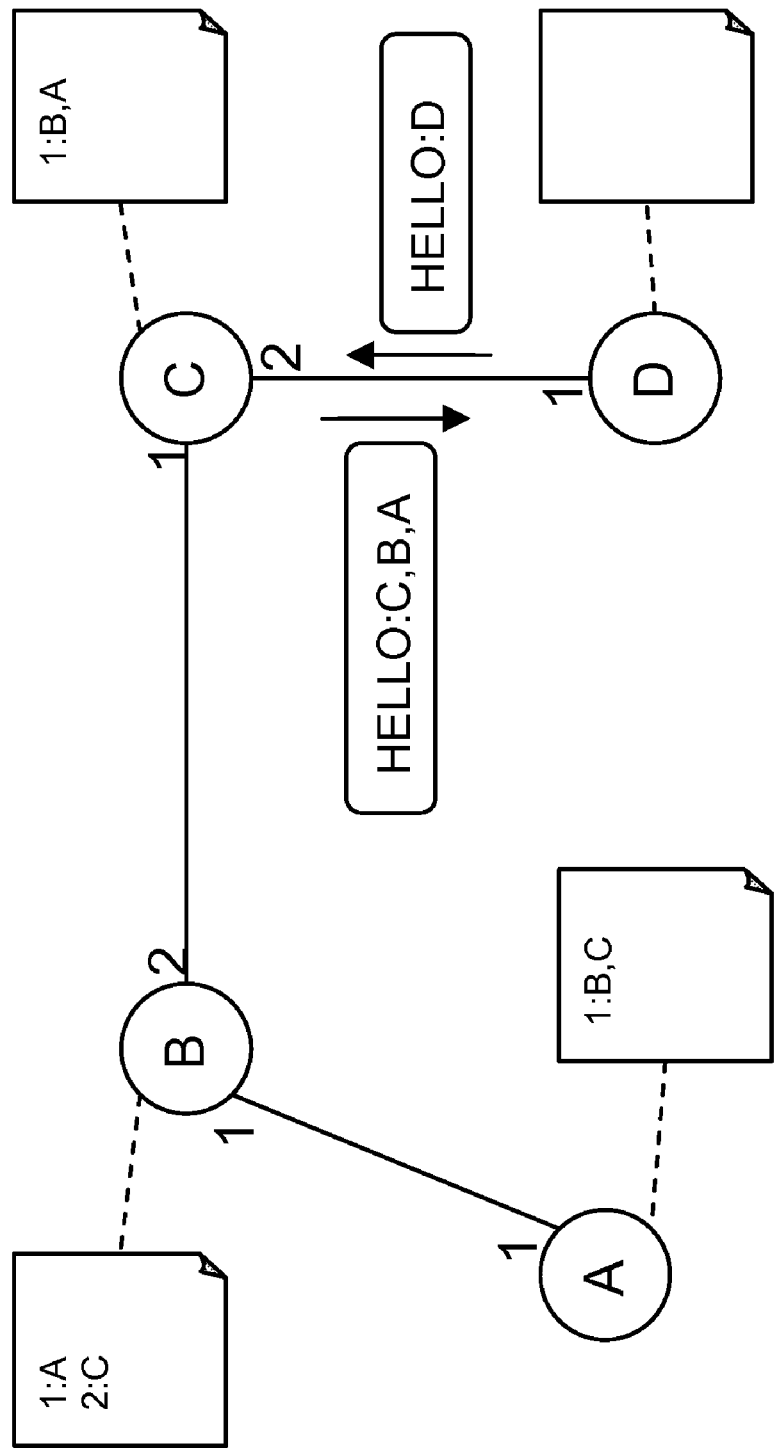
Figure 6 – composite and simple HELLOs

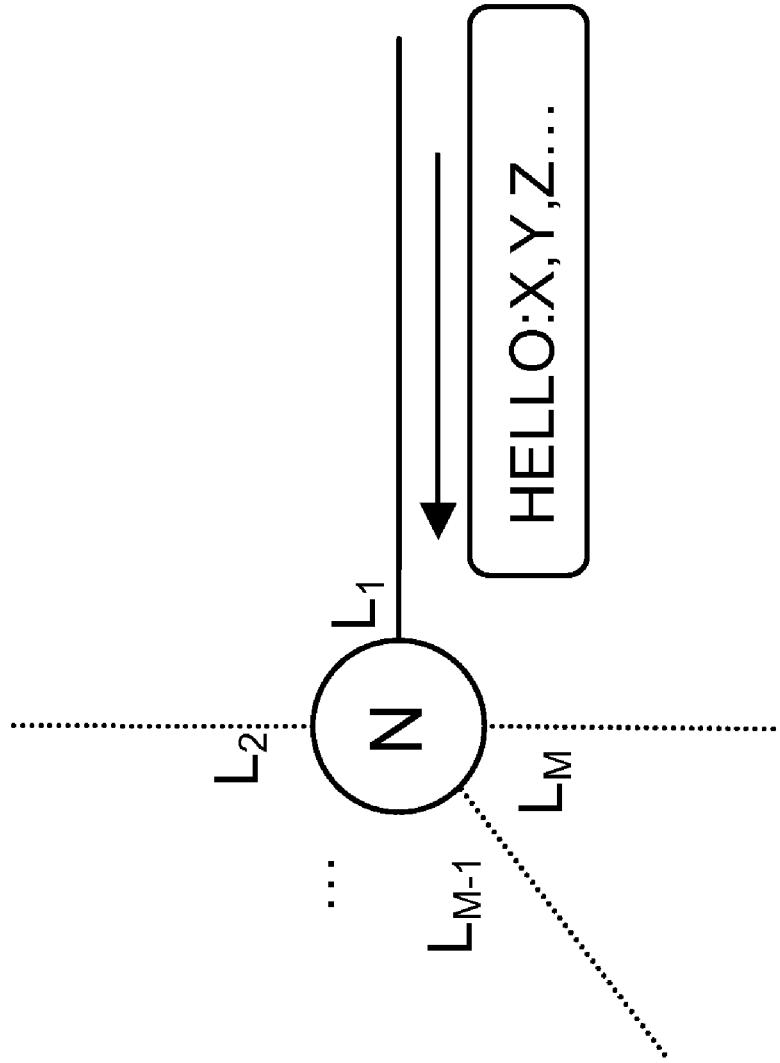
Figure 7 – Node N has M links $L_1$ through $L_M$

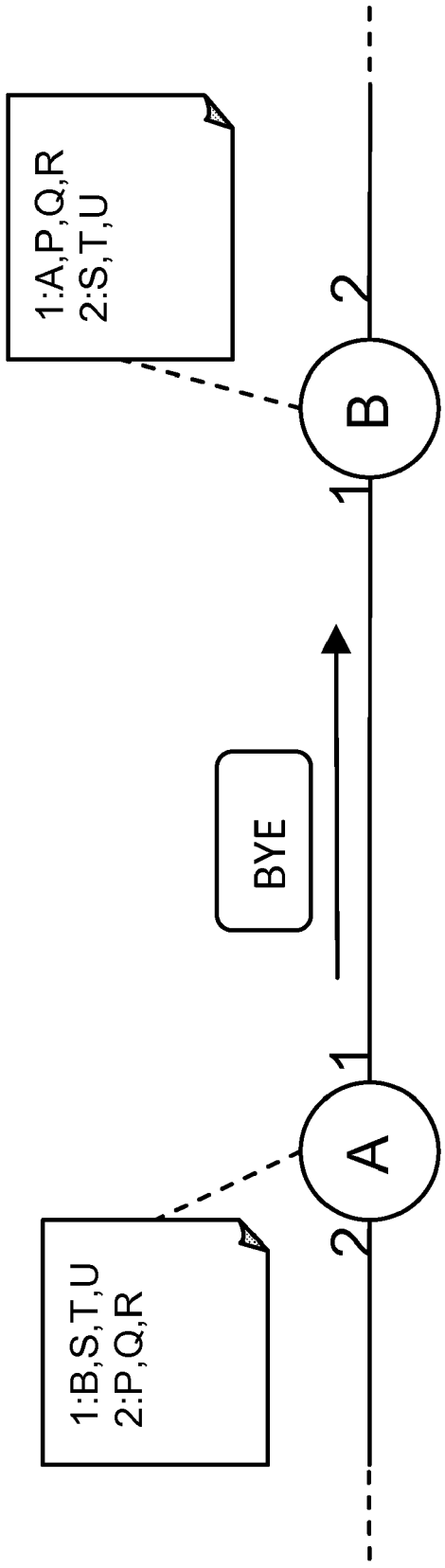
Figure 8 - Announced destruction

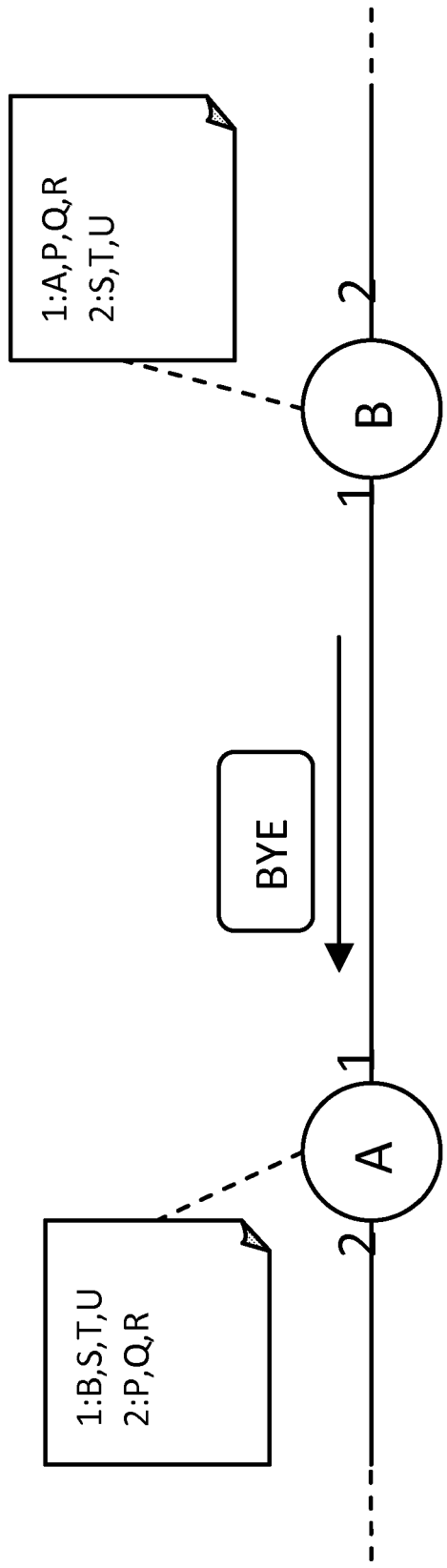
Figure 9 - reply to announced destruction

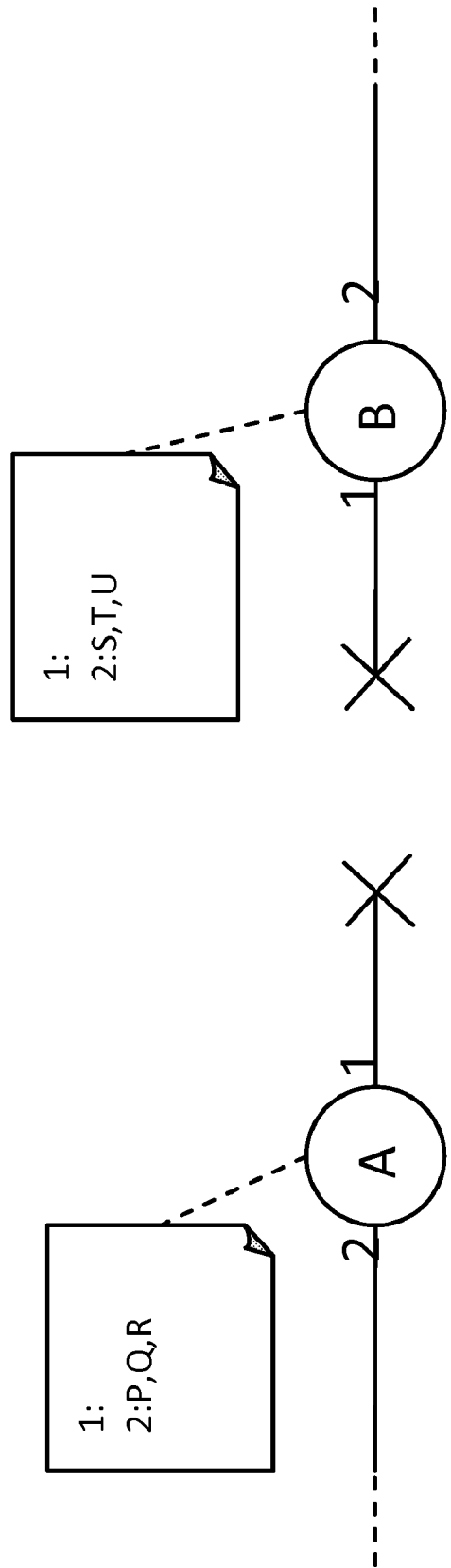
Figure 10 - link destruction

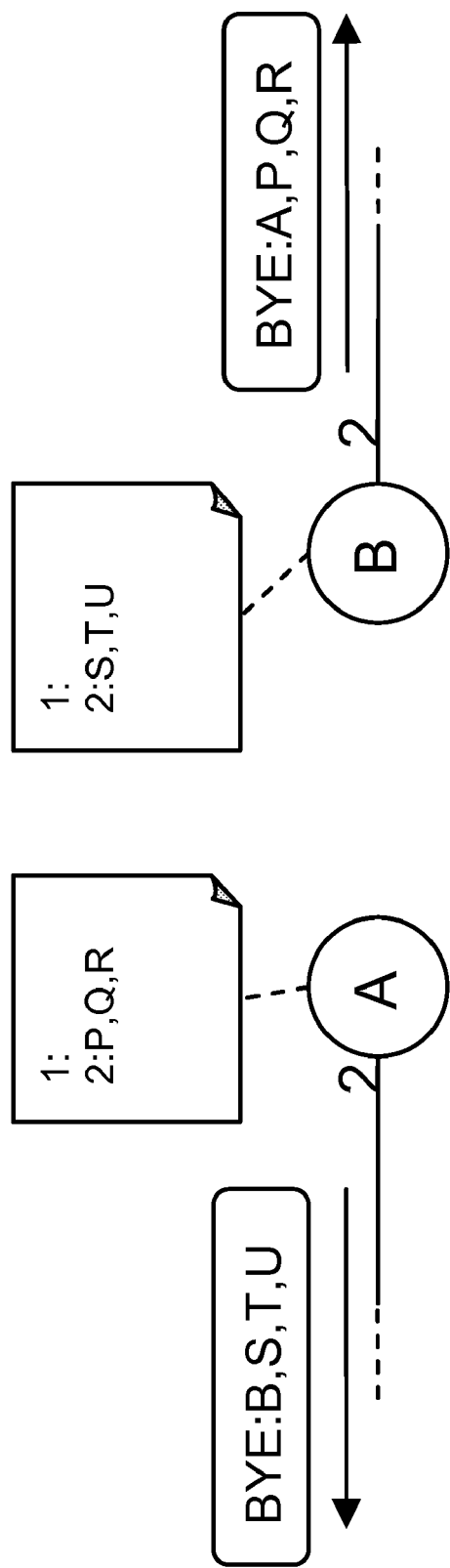
Figure 11 - Initial BYE forwarding

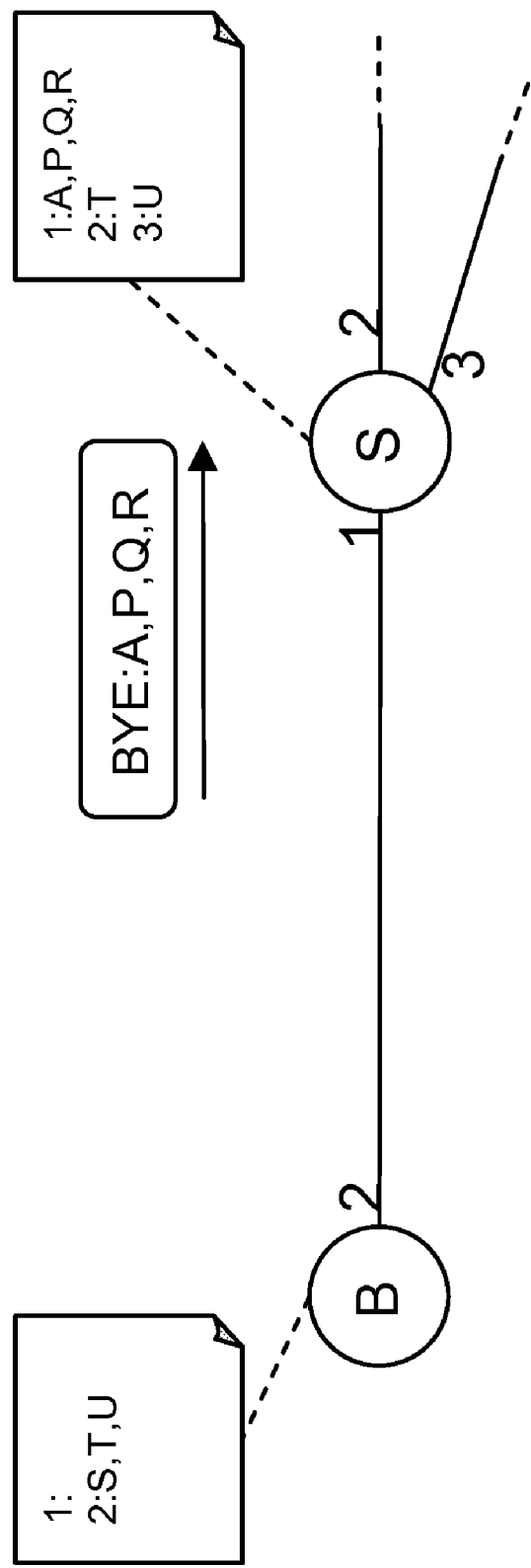
Figure 12 - Receiving a forwarded BYE message

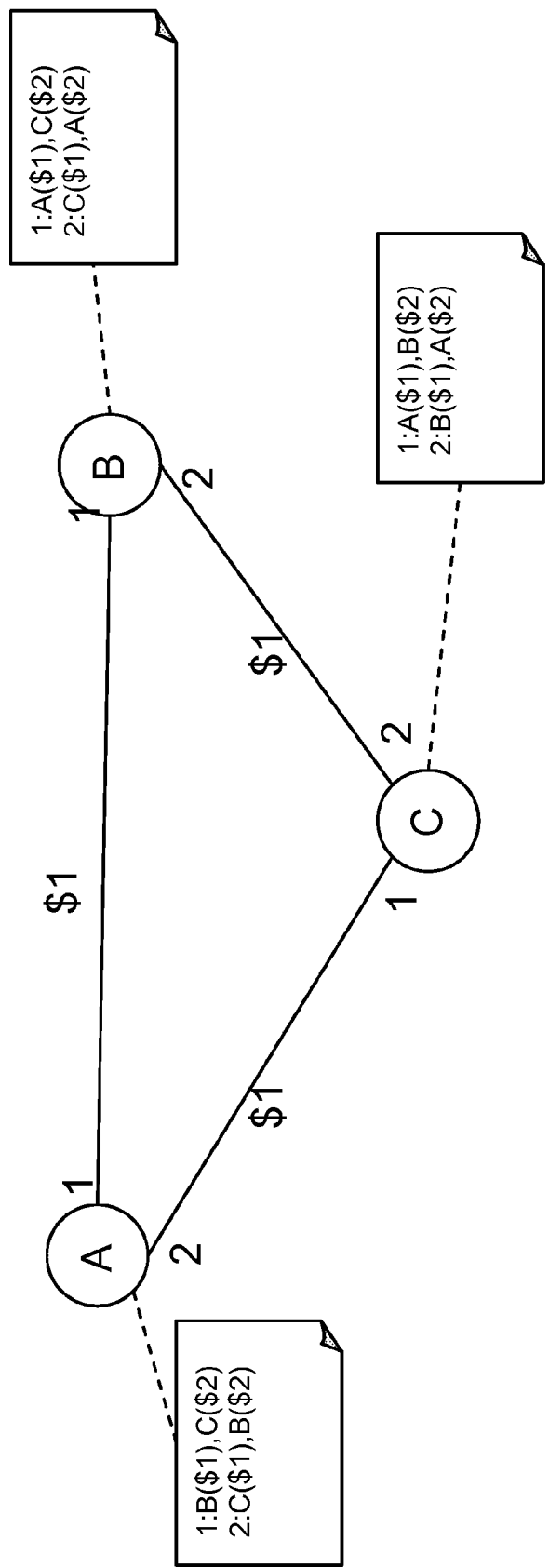
Figure 13 – all link cost $1, no forwarding cost

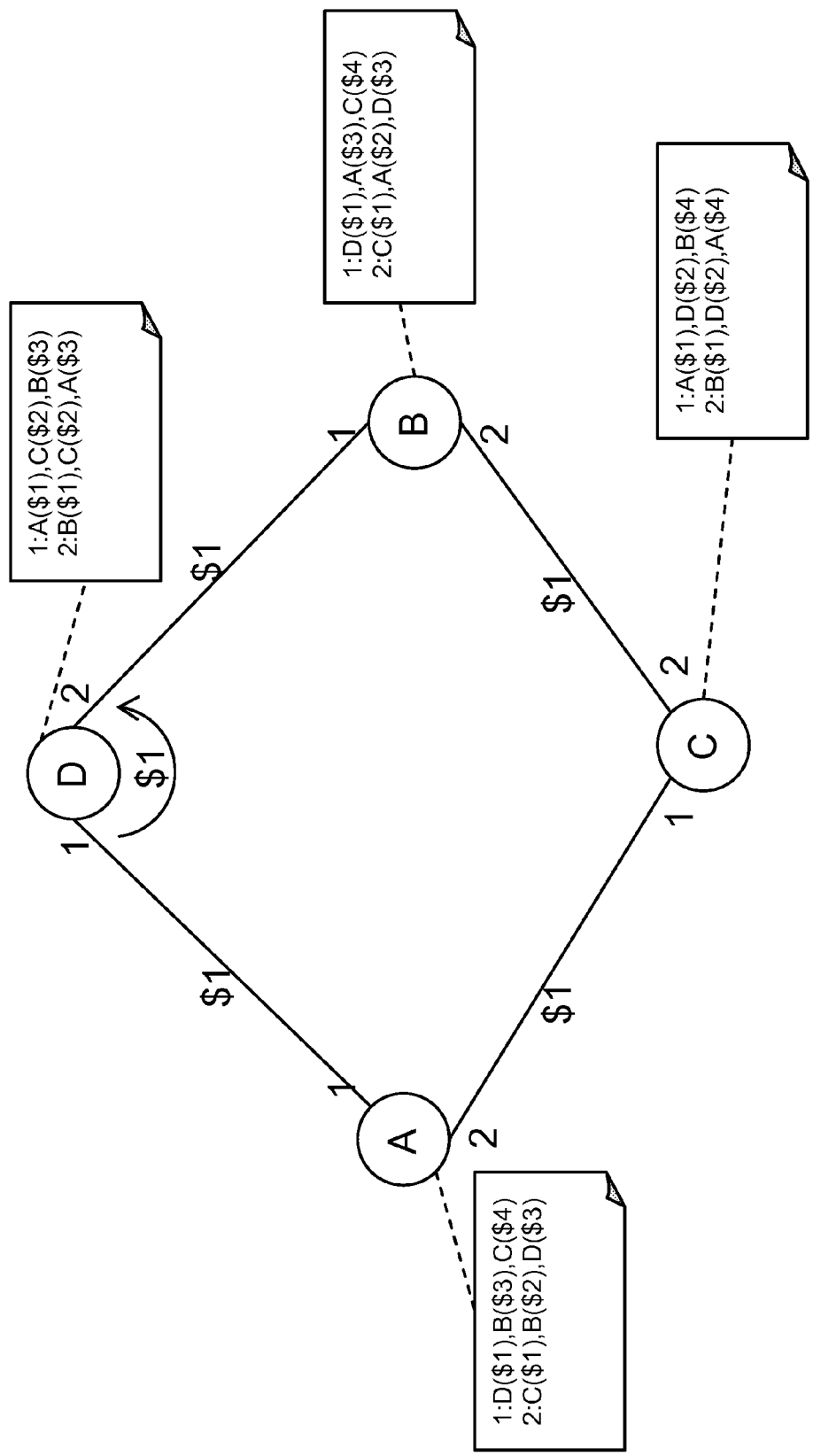
Figure 14 - Three land nodes with a satellite connection

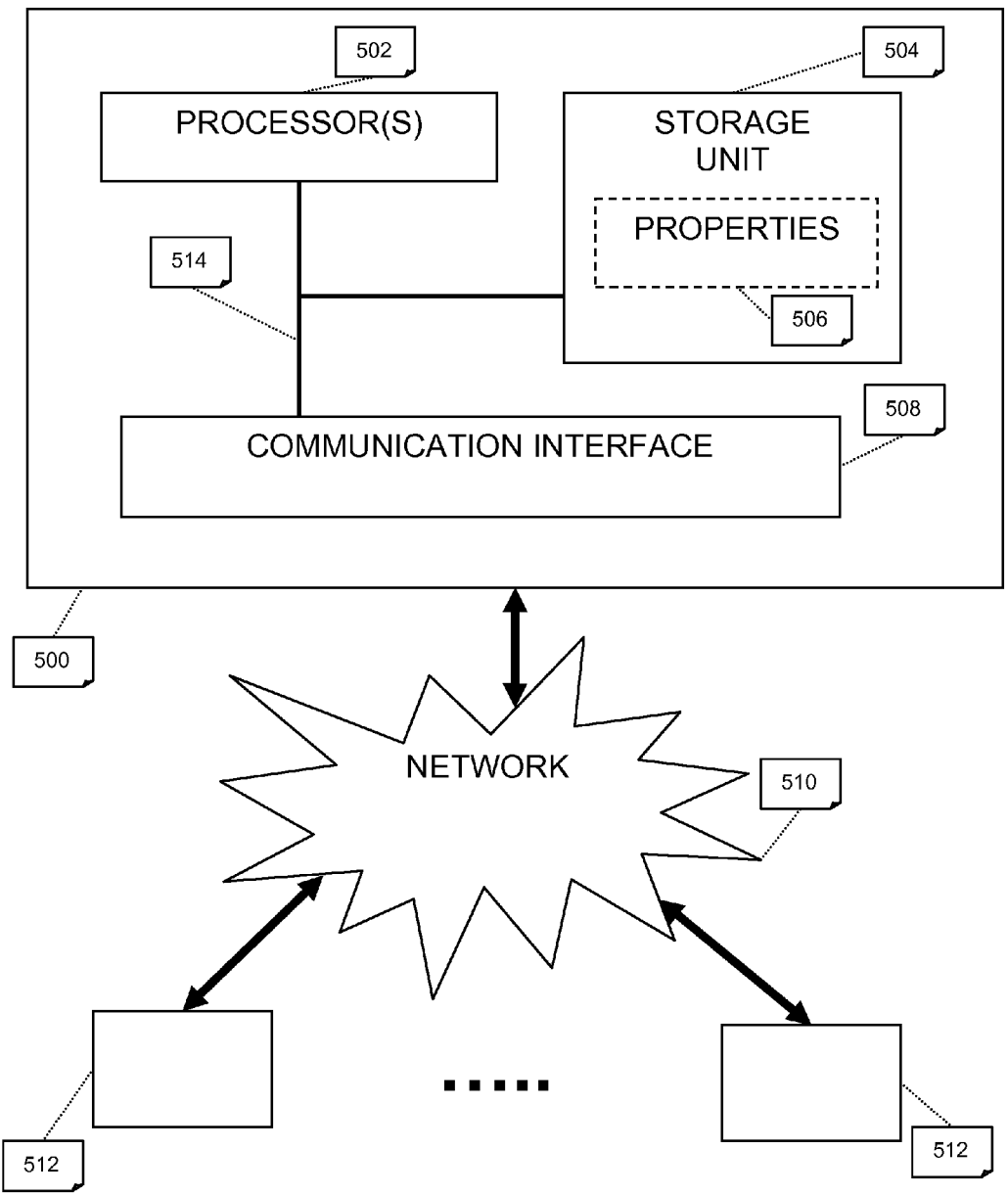
Figure 15 - Devices and network

METHOD, APPARATUS, SYSTEM, AND ARTICLE OF MANUFACTURE FOR RELIABLE LOW-BANDWIDTH INFORMATION DELIVERY ACROSS MIXED-MODE UNICAST AND MULTICAST NETWORKS

TECHNICAL FIELD

The present disclosure generally relates to computer software and/or hardware for computer and communication systems networking, and more particularly but not exclusively relates to information delivery between devices through a communication network for critical applications.

BACKGROUND INFORMATION

Timely and reliable information dissemination and delivery in high user-capacity environments is a key requirement in the successful completion of a mission or other task and, in life-threatening environments, ensuring the safety of personnel conducting the mission. In these kinds of environments, centralized content delivery systems—typically referred to as "servers"—are used to distribute information in a real-time or near real-time manner.

This type of centralized architecture, while generally functional, suffers from at least two significant drawbacks: 1) the reliance on a central server or cluster of servers that all endpoints directly or indirectly connect to or otherwise communicate with; and 2) inefficient use of available network bandwidth to deliver the information to the endpoints that require such information.

While there are variations on the theme of centralized servers—for example dividing the server cluster into multiple layers and clusters to achieve a notion of "divide and conquer"—the server-based architecture still generally suffers from the same basic issue: endpoints that require information have some sort of subscription in place that causes the server(s) to forward information to each endpoint as that information becomes available or is modified. This leads to the second major drawback of a server-based architecture where oftentimes scarce network resources are stretched to the point where information simply cannot be reliably delivered or where the time to deliver the information in a reliable manner exceeds the useful age of that information. For example: delivery of crucial mission intelligence to mission coordinators (such as rescue workers or mission commanders) on the ground may be delayed to the point where, by the time that intelligence reaches workers, the information is no longer useful—potentially placing lives and the mission at risk.

There are various methods of synchronizing data between serverless networked nodes, a field of study overlapping peer-to-peer networking and distributed networking. There are typically 2 lines of design: high-bandwidth and low-bandwidth. High-bandwidth peer-to-peer architecture aims at utilizing the most bandwidth possible to achieve fast file transfers and is usually not concerned with network congestions: these designs are at the application layer and they assume appropriate network conditions. On the other hand, low-bandwidth solutions are concerned with and interact at the network layer but their implementation and customization of the layers below the Transport layer on the ISO stack often translate into a reduced flexibility in term of network topology and heterogeneity; for instance wireless mesh networking designs often rely on a modified IP stack implemented at every node.

BRIEF SUMMARY

One embodiment described herein provides: first, its capacity to function in a heterogeneous and dynamic network topology; second, its reliability and scalability throughout low-bandwidth intermittent networks and high-bandwidth networks; and third, its original ad-hoc and multi-hop ad-hoc design.

If we call "endpoints" (or generally "nodes") nodes attached to a network by opposition to "players" defined as entities coupled to endpoints to access a network, and if we call "channel" a collection of endpoints coupled via:
- an IP multicast group address and Any Sender Multicast (ASM);
- point-to-point unicast connections;
- a heterogeneous combination of the 2 topologies above.

And if we call "player properties" an arbitrary key-value table of arbitrary size that is attached to each player, then we shall summarize this design as illustrated by way of example in FIGS. 1-2:

One aspect provides a method for communication in a network, the method comprising:
providing a first node having a first player with associated first player properties (FIG. 1);
providing a second node having a second player with associated second player properties (FIG. 1);
providing a third node having a third player with associated third player properties (FIG. 1);
coupling said second node to said first node and coupling said third node to said second node, to enable communication between said first, second, and third nodes via an IP multicast network so as to enable a sum of said first, second, and third player properties to form an information base for each said nodes (FIG. 2);
if one of said nodes is disconnected from other ones of said coupled nodes, updating said information base of each of said other ones of said nodes to remove the associated player properties of said disconnected node, and updating said information base of said disconnected node to remove the associated player properties of said other ones of said coupled nodes; and
if said disconnected node reconnects to a particular one of said coupled nodes, updating said information base of said reconnected node and said particular node and any node coupled thereto to include the associated player properties of said reconnected node.

Another aspect provides a communication system, comprising:
a plurality of distributed communication devices adapted to communicate with each other in an IP multicast network without use of a centralized server, each of said devices having respective properties that are communicated to other ones of said devices so that each device is aware of properties of all communicatively coupled devices in said IP multicast network; and
an information base for each of said devices, said information base being updated to remove properties of any of said devices that are communicatively decoupled and to add properties of any new ones of said devices that communicatively coupled to said IP multicast network.

Another aspect provides an article of manufacture, comprising:
a computer-readable medium having computer-readable instructions that are stored thereon and executable by a processor of one of a plurality of distributed communication devices, to:

communicate with other ones of said devices in an IP multicast network without use of a centralized server, each of said devices having respective properties that are communicated to other ones of said devices so that each device is aware of properties of all communicatively coupled devices in said IP multicast network; and update an information base, said information base being updated to remove properties of any of said devices that are communicatively decoupled and to add properties of any new ones of said devices that communicatively coupled to said IP multicast network.

Still another aspect provides a network computing apparatus, comprising:

one of said plurality of distributed communication devices adapted to communicate with each other in the IP multicast network without use of the centralized server, said device including:

a processor adapted to perform said update of said information base;

a storage unit coupled to said processor and adapted to store said information base that includes properties of said one device and properties of coupled other ones of said devices; and a communication interface coupled to said processor and to said storage unit and coupleable to said IP multicast network, and adapted to send and receive said properties and other communication with other ones of said devices via said IP multicast network

BRIEF DESCRIPTION OF THE SEVERAL VIEWS OF THE DRAWINGS

FIG. 1 illustrates example nodes with associated players and player properties according to one embodiment.

FIG. 2 illustrates the exchange of player properties/information between nodes.

FIG. 3 illustrates example nodes, routing tables, and links according to one embodiment.

FIGS. 4-12 illustrate example implementation of rules according to various embodiments.

FIGS. 13-14 illustrate example link costs and implementation thereof according to one embodiment.

FIG. 15 is a block diagram showing components of an embodiment of a device adapted to communicate with other devices via an IP multicast network.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The embodiment(s) described herein provide an architecture and mode of operation wherein information is disseminated using a reliable IP multicast network implementation coupled with dynamically assigned proxy nodes serving as zonal aggregation points. These nodes share information with each other over the reliable IP multicast network, augmenting this function with a reliable point-to-point communication infrastructure between proxy nodes in those instances where IP multicast is not available or prone to error.

An embodiment employs a number of conceptual entities to provide the features described herein. These entities include "channels", "players", "messages", "properties", and "nodes". A "channel" is a notional grouping of like-minded/like-use entities that have a desire or need to share information with each other. These entities are typically used to describe human end-users in an embodiment but may also refer to non-human entities such as computer devices, communications devices and systems, and so forth. A more general term therefore used to describe such an entity is a "player". Stated in another way, a "player" exists along with other "players" on a "channel" and uses the "channel" to exchange information with each other.

Such information includes "properties" describing attributes of individual players such as a human player's name, title, operational role, etc. or, in the case of non-human players, attributes such as an IP address, CPU configuration, bandwidth availability, etc. In short, the properties can include any information that is pertinent to that player identifying itself on a channel to other players.

In an embodiment, in addition to player-specific properties as described above, properties may be applied to the channel itself—e.g., the properties need not pertain to a specific player but may be used to describe information about a group of players or the channel itself. An example of such a property may be the name of the channel, the role of that channel, and specific messages that should be displayed to human end-users when they join that channel. Similarly, a channel-specific property may also be used in a manner so as to coordinate group access to shared resources—essentially operating as a channel-wide flag or semaphore.

In addition to properties, a channel of one embodiment also serves as a virtual conduit of "messages" between players. In an embodiment, such messages may constitute a simple implementation of textual or other data messaging between players or may be utilized in a more sophisticated manner such as implementing a group-wide signaling protocol for purposes of controlling the operation of players or the devices that they represent.

In an embodiment, all players, properties describing those players and the channel, as well as messages on the channel are sent and received by "nodes". A "node" is a logical interface to the channel provided by the underlying embodiment. This interface provides the conduit by which a computer application communicates on the channel.

In addition to providing this interface to the channel, a node may optionally function as a convergence point of data where the data needs to cross boundaries between channels—essentially "bridging" information across channels—or where the underlying networking infrastructure between instances of the channel is different. For example: in an embodiment, a node may pass data between instances of different channels ("bridging") so that data may be shared between those channels; or the node may pass data between instances of the same channel where those instances are implemented on different networking topologies—such as bi-directionally relaying data between IP multicast and IP unicast topologies.

Building on these concepts, an embodiment may then be implemented on a variety of networking topologies, be able to scale to many thousands of nodes, properties, and messages, and represent thousands of individual players.

Integrity Assurance Channels

In an embodiment, the ability to scale to thousands of players and the properties associated with those players while keeping bandwidth utilization to a minimum, implements the creation of a special channel to coordinate system-level data exchange between nodes. Such a special channel—known as an "Integrity Assurance Channel" (IAC)—is responsible for node-level data exchange to ensure the integrity and consistency of the data held at each node. Such data includes the list of players on the channel, their associated properties, properties associated with the channel itself, messages queued for delivery, and so forth. Such coordination is typically only needed in an environment where IP multicast is used as the underlying network topology but it should be noted that such coordination may also exist across more reliable links such as IP unicast utilizing TCP as a delivery protocol. The messages exchanged on the IAC are specific to the IAC and constitute a protocol implemented only by nodes on that IAC. Furthermore, multiple IACs may exist in an embodiment so as to reduce overhead on a particular IAC relative to the traffic generated on the "normal" channels associated with it. In this regard, multiple "normal" channels may be associated with a particular IAC, thereby consolidating their respective information onto a single IAC rather than each propagating their information separately—and potentially in duplicate. While such association may occur on an IAC-per-channel basis, the method for implementation in an embodiment is for multiple normal channels to be associated with a single IAC. Following this method assures the lowest amount of overall bandwidth consumption for the number of "normal" channels in use.

Security

Security is a component of one embodiment. To this end, an embodiment utilizes a variety of encryption technologies including but not limited to the Advanced Encryption Standard or "AES". In this embodiment, all messages exchanged over the IP network are assumed to be open to threat from outside entities and are therefore encrypted prior to transmission on the network. Further, and in this particular embodiment, the key used for encrypting data is pre-shared in nature—that is to say that all nodes learn about this key when they are first configured. While this is one particular method of key sharing, other methods exist such as Diffie-Hellman key exchange.

"Exhaustive Routing" Algorithm for Peer-to-Peer Networking

In one embodiment, nodes are connected/coupled to each other in a peer-to-peer network. Each node may have several connections or "links" to other nodes, and nodes not connected by a common link can communicate by passing messages through intermediate nodes in a multihop ad-hoc fashion. The routing algorithm allows nodes to find optimum routes between themselves and another node. Each node has a routing table that lists what link to use to reach a specific other node. The routing table lists every single node in the network, hence the name "exhaustive routing", and what link to use for that node. The routing table of one embodiment need not show a full route, but only a one-hop route to the next node. Since every node has a full list of all nodes in the network, when the next-hop node receives a message, that node knows where to forward the message next. As shown in FIG. 3, nodes are circles, and routing tables are notes attached to nodes through a dashed line.

The numbers at the edges of the links between nodes show how nodes refer to these links. For instance, in FIG. 3, A calls its link to B "1". Link numbers are internal to nodes and not communicated to other nodes: for instance, in the FIG. 3, B calls its link to C "2", but C calls its link to B "1". These numbers reflect the order they were created on the nodes. Still in FIG. 3, if A wants to send a message to C, it sees from its routing table that C is reachable through link 1. Thus A will send a message to B, which sees the message is intended for C. B then looks up its routing table and see C is reachable through link 2. Thus B will forward the message onto its link 2. C then receives the message.

Besides providing routes to nodes, the routing table of one embodiment serves another purpose: it lists all nodes currently connected/coupled to the network, providing nodes with "network-wide presence" information. If a node enters or leaves the network, all other nodes are informed of the entry/departure through a mechanism as will be described below. In a specific embodiment, the exhaustive-routing algorithm can be used exclusively to maintain presence information throughout a network.

In one embodiment, routing tables at nodes throughout the network are kept current with the following messaging system: there are 2 basic messages, HELLO and BYE that are exchanged between nodes to maintain accurate routing tables. HELLOs and BYEs are generated, interpreted, and forwarded from node to node according to the following example 8 rules:

Rule #1: Link Creation, HELLO Messages

The first rule is that when 2 nodes create a link to each other, they send a HELLO message stating their name. An example implementation of this rule is illustrated in FIG. 4.

If a node "knows of" other nodes, that node mentions them in the HELLO message. A node "knows of" other nodes by reading its routing table and gathering a list of all node names from all links. When a HELLO message contains more than a node's own name, such a message is called a "composite HELLO". Implementation of a composite HELLO message is shown in FIG. 5. A composite HELLO message of one embodiment need not specify how to reach the other nodes, but only their names. If a node appears several times in the routing table, that is not repeated in the HELLO message, as for instance in FIG. 5, node Z appears twice in X's routing table but is provided only once in the HELLO message.

So going back to FIG. 3, if a standalone node D with no prior links was to form a link with node C, then D would send "HELLO:D" to C and C would send "HELLO:C,B,A" to D, as seen in FIG. 6.

Rule #2: Asynchronicity

The second rule explains that the order of events that lead to a new link between 2 nodes, such as in FIG. 6, is irrelevant: the only requirement of one embodiment is that the 2 HELLO messages described above are sent to the newly-connected/coupled neighbor node. Depending on context (e.g., hardware architecture, software architecture and operating system, API used), the creation of the link between 2 nodes can be a one-sided operation: the link can be created by one node only. In other cases, in order for an inter-node link to be created several messages are exchanged at the network or transport layer, and both nodes may need to initiate the link. In any case, the connection is first fully established, and then the exchange of HELLO happens.

Rule #3: HELLO Forwarding

The third basic rule explains how nodes forward incoming HELLO messages. In the example of FIG. 6, D would not have to forward its incoming HELLO message since it has no other link, but C would consider forwarding its incoming HELLO message from D onto its other links. The rule (illustrated by the example implementation in FIG. 7) is as follows in one embodiment:

On a given node N that has M links to other neighbor nodes, when a HELLO message comes in from a link $L_1$, that HELLO message is first decomposed into a list of "simple HELLOs". A composite HELLO message "HELLO:X,Y, Z . . . " can be decomposed into a list of simple HELLOs: {"HELLO:X", "HELLO:Y", "HELLO:Z", . . . }. For each of these simple HELLO message, the node N needs to iterate through each of its M links except for link $L_1$, and consider if the simple HELLO message needs to be forwarded onto that link or not.

The criteria for a HELLO about a node X, "HELLO:X", to be forwarded onto a link $L_i$ is the following: considering N's routing table, considering the entries of that routing table, and that each entry lists what nodes are reachable for a given link, in order to forward "HELLO:X" onto a link $L_i$, the entries in the routing table for any link but $L_i$ need to show no instance of X. In other words, the node needs to forward a HELLO about X onto a link $L_i$ if and only if all entries in the routing table beside the one for $L_i$ do not list X.

Rule #4: Routing Table Update after HELLO Forwarding

The fourth rule states that once the third rule is fulfilled on a given node N, that is to say that N is done with forwarding an incoming HELLO message, to the node N updates its routing table before undertaking any other communication. The order of operation—forwarding first, updating routing table second—is used in one embodiment because the forwarding process (that was shown and described above) reads the routing table.

If 2 HELLO messages are received at once, the first one is processed according to rule 3, then rule 4 is applied; and the second HELLO is processed according to rule 3, then rule 4 is applied. The fourth rule of one embodiment provides that: for a HELLO message received from a link L on a node N that lists P nodes: "HELLO:$X_1, X_2, X_3, \ldots, X_P$", N updates the entry for L in its routing table by adding $X_1, X_2, X_3, \ldots, X_P$ to that entry. Routing table entries are sets of unique node names, so if for instance an entry was to list "A,B,C" and "B,D" is to be added, then the entry would be updated to "A,B,C,D".

Rule #5: Link Destruction, BYE Messages

Link destruction is operated by BYE messages in one embodiment. When 2 nodes A and B are connected and A decides to destroy the edge, A can send/announce a BYE message to B as shown by way of example in FIG. 8.

This kind of BYE message of one embodiment has no payload (unlike forwarded BYE messages with respect to rule #6, described later below): it means the current edge is going to be disconnected/decoupled.

When B receives the BYE message, B replies with a BYE message as shown by way of example in FIG. 9.

And both nodes end the connection (link destruction), as shown by way of example in FIG. 10.

At this point, A and B would proceed to BYE forwarding (see, e.g., rule #6).

The kind of exchange described above is an "announced link destruction", meaning that the nodes inform each other the link destruction before actually taking the link down. An alternative is the "unannounced link destruction" where one of the nodes (or both) takes the link down without sending a BYE message. Unless the link comes back up within a defined period, the nodes proceed to BYE forwarding (see, e.g., rule #6) just as if a BYE was received.

Rule #6: BYE Forwarding

Once a link is destroyed (whether announced or unannounced: see, e.g., rule #5), the 2 nodes at each end of the severed link inform their remaining neighbors of the link loss by sending BYE messages that list what nodes used to be visible on the destroyed link. FIG. 11 shows an example implementation of this rule, wherein the nodes A and B forward BYE messages that list what nodes used to be visible on the (now-destroyed) link(s).

It is noted that in one embodiment, the original BYE message had no payload, but the forwarded BYE messages have a payload: that of the list of nodes that were reachable through that edge.

Just like for HELLO messages, when a BYE message arrives at a node, the BYE message is decomposed into simple BYE messages, and each one is considered for forwarding on each link. FIG. 12 illustrates an example implementation.

The difference with HELLO messages is that the routing table is updated first and forwarding happens second. Updating the routing table includes removing references to the nodes listed in the BYE message for (and only for) the link that BYE message was received on. The forwarding logic is the following in one embodiment: once the incoming composite BYE message is decomposed into a list of simple BYE messages, each simple BYE message is considered for forwarding on each link (besides the one it came on). For a given link, a simple BYE is forwarded if (and only if) the node it refers to is not present (in the routing table) in any other link entry but itself. So for instance, if a node has 3 links L1 L2 and L3, and that node received a BYE about node X on $L_i$, then that node will forward the BYE onto L2 if X is not listed (in the routing table) as a visible node from L1 and L3; and the node will forward the BYE onto L3 if X is not listed (in the routing table) as visible node from L1 and L2.

Rule #7: HELLO and BYE Recomposition

As described herein for one embodiment, when forwarding composite HELLO messages or composite BYE message, a node is first decomposes into simple messages ("simple" meaning that the message has a payload of 1 node), and then these simple messages are considered one by one for forwarding onto a given link.

In order to limit traffic according to one embodiment, simple messages can be recomposed (re-assembled) into composite messages if and only if they have the same source. HELLOs and BYEs have a field in their header that defines what node originally sent them. When messages are forwarded, this "source" field is not changed.

Rule #8: History-Based Message Pruning

Another field in both HELLO and BYE message headers is the message counter at the source. This message counter is a roll-over counter that a node increments whenever the node sends a message. The combination of the source field and this counter field forms a message ID that is unique within a certain period of time (determined by the size of the roll-over counter).

In one embodiment, these message IDs are stored in a history log per link on each node.

These history logs are used to filter out messages that appear more than once on a same link on a given node. If a message arriving at a node's link has a message ID that matches the history log, the message is discarded before any processing.

Both the roll-over counter width and the history log size are adjusted to sensible values to implement a fairly efficient history-based message pruning. The pruning of one embodiment only needs to be fair and not perfect since this pruning helps lower traffic in case of topologies with loops, but this pruning is not necessary to the routing algorithm. The routing algorithm is resilient to over-sending. Repeated packets only increase traffic (which may lead to longer transient state), but not overall stability.

The above embodiment(s) of 8 rules describe how routing messages are transmitted and how messages alter nodes' routing tables. Ultimately, the nodes' routing tables act as a distributed database that establishes global network presence information: each node knows what other nodes are part of the network and how to reach them. The algorithm according to one embodiment allows a completely determined network presence mechanism. Presence information may be sufficient in some scenarios, but another role of the routing table is to provide optimized data routing between nodes.

Optimized Data routing is possible by keeping track of link cost and forwarding cost. The HELLO message header contains a cost field that is initialized to zero at the source node, and is incremented by a determined amount every time the message goes through a link: link cost, and by another determined amount every time the message is forwarded by a node: forwarding cost. Eventually, when a HELLO message is sourced at a node A and arrives at a node B, its cost field reflects the sum of all these increments. These costs are stored in the routing table, and are used to find optimized root. An example implementation is shown in FIG. 13.

In FIG. 13, costs are represented with the dollar symbol '$'. In this example, all link costs are set to 1 and there are no forwarding costs. The routing tables reflect costs with $ values in parenthesis. For instance, if A wants to send data to B, its routing table shows it can reach B from its link #1 or its link #2, but on link #1 a cost of 1 is associated B, and on link #2 a cost of 2 is associated to B therefore a message to B should be sent onto link #1.

When a node wants to send data to another node it does so by prepending a specific message header to it. The message header contains several fields, most current to all network designs (such as the payload length, a CRC of the payload, etc.), but also a value field that is similar to the time to live (TTL) field of IP packets. The difference with TTL is that the value field is decremented by the various link costs and forwarding costs (the TTL is decremented uniformly at each hop). Just like a TTL, when the value of a message reaches 0 the message is dropped.

When certain routes become too busy or unavailable, high-priority messages can be given higher value fields to give the routing algorithm more options. In FIG. 14, node D has a forwarding cost, it could be for instance that A, B, and C are linked by a land network and D is a telecommunication satellite. During normal operation when the land network is available, all data messages between A, B and C would use the land network: the routing tables reflect that optimized routes never go through D. During normal operation, if A wants to send data to B, A needs its message value to be set to 2. However if A loses its connection to C, messages with a value of 2 will not even leave A since there is no available route that has a cost of 2 or less. Messages with a value of 3 would use the satellite connection through D and would resume using C as soon as the land network comes back up.

In an embodiment, nodes may become disconnected from the larger system on an often but random basis and may very quickly reconnect either to the same node or one it was not previously connected to. In such an event, the immediate removal of a disconnected node's information from all other nodes in the system is not desirable as the resulting resynchronization upon reestablishment of connectivity will result in an inefficient use of networking and CPU resources. To mitigate against this, one embodiment employs timers on both ends of the list connection, starting those timers upon disconnection and canceling them upon reconnection. If reconnection does not occur within the timeframe specified by the timer on each end, the information is removed from all nodes (using the system of BYE messages described above). If however, reconnection does occur, the reconnecting nodes simply exchange a signature of the data they each contain (instead of the complete system of HELLO messages described above). This signature is represented as a list of the players represented by each of the two nodes involved in the connection and a hash of the combined properties for each of those players. If the signature received by a node from the other node matches the signature the node itself calculates, then no data exchange is required as the data is deemed to be identical on either side. If the signature does not match—either in one direction or both—the nodes initiate a request/response exchange for a list of players and their properties for which the individual signatures differ (using the complete system of HELLO messages described above). This algorithm ensures efficient use of networking and CPU resources, and dramatically reduces the perception of system thrashing on the part of human end-users.

FIG. 15 illustrates an embodiment of a network computing device 500 that can form one of more devices in a node. Examples of the network device 500 can include, but not be limited to, a cellular telephone, laptop computer, mobile wireless communication device (such as a PDA, Blackberry, and the like), desktop computer, server, switch, router, or any other network device having communication capability.

One embodiment of the network device 500 includes one or more processors 502 adapted to perform updates of the information base that stores the properties associated with the network device 500, as well as the properties of other devices 512 as explained above. The processor(s) 502 is also adapted to perform other acts associated with operation of the network device 500.

In an embodiment, the network device 500 includes a computer-readable storage medium 504, such as a memory, adapted to store computer-readable instructions that can be executed by the processor 502. For example, such computer-readable instructions can be in the form of a software program executable by the processor 502 to perform the update of properties, communication of properties and other messages, encrypt/decrypt communicated information, and various other features described herein. The storage medium 502 may store an information base that includes the properties 506, such as the properties described above.

A communication interface 508 is provided to enable communication of the properties and other messages to other devices 512 via a network 510, such as an IP multicast network. In one embodiment, the network interface is adapted to communicate the properties via the integrity assurance channel, which can be different than a normal channel used to communicate messages between the devices 512 via the IP multicast network 510.

A bus 514 couples the various components of the network device 500 to each other.

The following applications owned by the assignee of the present application are incorporated herein by reference in their entireties: U.S. Provisional Patent Application Ser. No. 61/077,413, entitled "METHOD, APPARATUS, SYSTEM, AND ARTICLE OF MANUFACTURE FOR RELIABLE LOW BANDWIDTH INFORMATION DELIVERY ACROSS MIXED-MODE UNICAST AND MULTICAST NETWORKS," filed Jul. 1, 2008; U.S. patent application Ser. No. 10/977,115, entitled "WIDE AREA VOICE ENVIRON- MENT MULTI-CHANNEL COMMUNICATIONS SYSTEM AND METHOD," filed Oct. 29, 2004, which in turn claims priority from U.S. Provisional Patent Application Ser. No. 60/516,233, filed Oct. 31, 2003; U.S. patent application Ser. No. 12/057,289, entitled "METHOD, APPARATUS, SYSTEM, AND ARTICLE OF MANUFACTURE FOR PROVIDING DISTRIBUTED CONVERGENCE NODES IN A COMMUNICATION NETWORK ENVIRONMENT," filed Mar. 27, 2008, which in turn claims priority from U.S. Provisional Patent Application Ser. No. 60/908,878, filed Mar. 29, 2007.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for communication in a network, the method comprising:
   receiving information regarding a first node associated with a first player, the first player having associated first player properties including one or more of: a human player's name, a human player's title and a human player's operational role;
   receiving information regarding a second node associated with a second player having associated second player properties, which are either a set of device specific properties or a set of human specific properties;
   receiving information regarding a third node associated with a third player having associated third player properties, which are either a set of device specific properties or a set of human specific properties;
   communicatively coupling said second node to said first node and coupling said third node to said second node, to enable communication between said first, second, and third nodes via an IP multicast network so as to enable a sum of said first, second, and third player properties to form an information base for each of said nodes;
   in response to one of said nodes becoming disconnected from other ones of said communicatively coupled nodes, updating said information base of each of said other ones of said communicatively coupled nodes to remove the associated player properties of said disconnected node, and updating said information base of said disconnected node to remove the associated player properties of said other ones of said communicatively coupled nodes; and
   in response to said disconnected node becoming communicatively reconnected to a particular one of said communicatively coupled nodes, updating said information base of said communicatively reconnected node and said particular node and any node communicatively coupled thereto to include the associated player properties of said communicatively reconnected node.

2. The method of claim 1 wherein said first, second, and third player properties are communicated between said communicatively coupled nodes via an integrity assurance channel that is different than a normal channel used to communicate messages between said nodes via said IP multicast network.

3. The method of claim 1, further comprising providing security for communication of said first, second, and third player properties.

4. The method of claim 1, further comprising using at least one of said communicatively coupled nodes as a bridge between said IP multicast network and an external network.

5. The method of claim 1 wherein at least one of said players is a human and each of said second and third player properties include one or more of: a human player's name, a human player's title and a human player's operational role.

6. The method of claim 1 wherein said second and third player properties are respective sets of device specific properties which include one or more of: a CPU configuration and bandwidth availability.

7. The method of claim 1, further comprising implementing at least one rule that specifies:
   link creating and exchanging HELLO messages;
   asynchronicity;
   forwarding of received HELLO messages;
   routing table updating after forwarding HELLO messages;
   link destruction and exchange of BYE messages;
   forwarding of BYE messages after link destruction;
   recompositing of simplified BYE and HELLO messages; and
   history-based message pruning.

8. The method of claim 1, further comprising performing optimized data routing using either or both link cost information and forwarding cost information.

9. A communication system, comprising:
   a plurality of distributed communication devices adapted to communicate with each other in an IP multicast network without use of a centralized server, each of said communication devices being associated with a respective player having respective player properties, the player properties of at least one of the players including one or more of: a human player's name, a human player's title and a human player's operational role, that are communicated to other ones of said communication devices so that each communication device is aware of respective player properties of all communicatively coupled communication devices in said IP multicast network; and
   an information base for each of said communication devices, said information base being updated to remove the respective player properties of any of said communication devices that are communicatively decoupled from said IP multicast network and to add the respective player properties of any new ones of said communication devices that are communicatively coupled to said IP multicast network.

10. The system of claim 9, further comprising an integrity assurance channel that is different than a normal channel used to communicate messages between said communication devices via said IP multicast network.

11. The system of claim 9 wherein said communicated player properties are encrypted.

12. The system of claim 9 wherein one of said communication devices is adapted to operate as a bridge device between said IP multicast network and an external network.

13. The system of claim 9 wherein each of said communication devices is adapted to communicate with another of said communication devices using point-to-point communication.

14. The system of claim 9 wherein each of said communication devices is adapted to implement at least one rule that specifies:
link creation and exchange of HELLO messages;
asynchronicity;
forward of received HELLO messages;
routing table updates after forward of HELLO messages;
link destruction and exchange of BYE messages;
forward of BYE messages after link destruction;
recomposition of simplified BYE and HELLO messages; and
history-based prune of messages.

15. The system of claim 9 wherein each of said communication devices is adapted to perform optimized data routing using either or both link cost information and forwarding cost information.

16. An article of manufacture, comprising: a non-transitory computer-readable medium having computer-readable instructions that are stored thereon and executable by a processor of one of a plurality of distributed communication devices, to:
communicate with other ones of said communication devices in an IP multicast network without use of a centralized server, each of said communication devices being associated with a respective player having respective player properties including one or more of: a human player's name, a human player's title and a human player's operational role, that are communicated to other ones of said communication devices so that each communication device is aware of respective player properties of all communicatively coupled communication devices in said IP multicast network; and
update an information base, said information base being updated to remove the respective player properties of any of said communication devices that are communicatively decoupled from said IP multicast network and to add the respective player properties of any new ones of said communication devices that are communicatively coupled to said IP multicast network.

17. The article of manufacture of claim 16 wherein said non-transitory computer-readable medium further includes computer-readable instructions stored thereon that are executable by said processor to:
communicate said player properties via an integrity assurance channel that is different than a normal channel used to communicate messages between said communication devices via said IP multicast network.

18. The article of manufacture of claim 16 wherein said non-transitory computer-readable medium further includes computer-readable instructions stored thereon that are executable by said processor to:
encrypt said communicated player properties.

19. The article of manufacture of claim 16 wherein said non-transitory computer-readable medium further includes computer-readable instructions stored thereon that are executable by said processor to:
operate, one of the plurality of communication devices, as a bridge device between said IP multicast network and an external network.

20. The article of manufacture of claim 16 wherein said non-transitory computer-readable medium further includes computer-readable instructions stored thereon that are executable by said processor to:
implement at least one rule that specifies:
link creation and exchange of HELLO messages;
asynchronicity;
forward of received HELLO messages;
routing table updates after forward of HELLO messages;
link destruction and exchange of BYE messages;
forward of BYE messages after link destruction;
recomposition of simplified BYE and HELLO messages; and
history-based prune of messages.

21. The article of manufacture of claim 16 wherein said non-transitory computer-readable medium further includes computer-readable instructions stored thereon that are executable by said processor to:
perform optimized data routing using either or both link cost information and forwarding cost information.

22. A network computing apparatus, comprising:
a communication device that communicatively coupleable with a plurality of distributed communication devices adapted to communicate with each other in an IP multicast network without use of a centralized server, each of said communication devices configured to be associated with a respective player having respectivelb a properties, the respective player properties of at least one of the players including one or more of: a human player's name, a human player's title and a human player's operational role, that are able to be communicated to other ones of said communication devices so that each communication device is aware of respective player properties of all communicatively coupled communication devices in said IP multicast network, wherein
each of said communication devices is associated with a respective information base configured to be updated to remove the respective player properties of any of said communication devices that are communicatively decoupled from said IP multicast network and to add the respective player properties of any new ones of said communication devices that are communicatively coupled to said IP multicast network, the communication device including:
a processor adapted to perform said update of the respective information base of the communication device;
a storage unit coupled to said processor and adapted to store the respective information base that includes the respective player properties of the communication device and the respective player properties of coupled other ones of said communication devices; and
a communication interface coupled to said processor and to said storage unit and coupleable to said IP multicast network, and adapted to send and receive respective player properties of said devices and other communication with other ones of said devices via said IP multicast network.

23. The apparatus of claim 22 wherein the communication device includes at least one of a cellular telephone, laptop computer, mobile wireless communication device, desktop computer, server, switch, router, and other network device.

24. The apparatus of claim 22 wherein said processor is adapted to encrypt and decrypt said respective player properties of said communication devices communicated via said IP multicast network.

25. The apparatus of claim 22 wherein the communication device is adapted to operate as a bridge device between said IP multicast network and an external network.

26. The apparatus of claim 22 wherein said communication interface is adapted to communicate said respective player properties of said communication devices via an integrity assurance channel that is different than a normal channel used to communicate messages between said communication devices via said IP multicast network.

* * * * *

UNITED STATES PATENT AND TRADEMARK OFFICE
CERTIFICATE OF CORRECTION

PATENT NO.         : 8,340,094 B2                                    Page 1 of 1
APPLICATION NO.    : 12/494728
DATED              : December 25, 2012
INVENTOR(S)        : Clack et al.

It is certified that error appears in the above-identified patent and that said Letters Patent is hereby corrected as shown below:

In the Claims

Column 14, Line 20, Claim 22:
"with a respective player having repectivelb a properties," should read, --with a respective player having respective player properties,--.

Signed and Sealed this
Twenty-fourth Day of September, 2013

Teresa Stanek Rea
*Deputy Director of the United States Patent and Trademark Office*